US008505307B2

(12) United States Patent
Wang (10) Patent No.: US 8,505,307 B2
(45) Date of Patent: *Aug. 13, 2013

(54) TRANSLATING VARIABLE AREA FAN NOZZLE WITH SPLIT BEAVERTAIL FAIRINGS (75) Inventor: Shunshen Richard Wang, Chula Vista, CA (US)

(73) Assignee: Rohr, Inc., Chula Vista, CA (US)

(*) Notice: Subject to any disclaimer, the term of this patent is extended or adjusted under 35 U.S.C. 154(b) by 1252 days.

This patent is subject to a terminal disclaimer.

(21) Appl. No.: 12/419,080

(22) Filed: Apr. 6, 2009

(65) Prior Publication Data

US 2010/0064659 A1    Mar. 18, 2010

Related U.S. Application Data (63) Continuation-in-part of application No. PCT/US2008/072448, filed on Aug. 7, 2008.

(60) Provisional application No. 60/954,756, filed on Aug. 8, 2007.

(51) Int. Cl.
*F02K 1/00* (2006.01)
(52) U.S. Cl.
USPC ..... 60/771; 60/226.2; 244/110 B; 239/265.25
(58) Field of Classification Search
USPC ..... 60/770, 771, 226.2, 226.3, 230; 239/265.25, 239/265.29; 244/110 B
See application file for complete search history.

(56) References Cited

U.S. PATENT DOCUMENTS

| 3,360,308 | A | | 12/1967 | Grabowski et al. |
| 3,404,581 | A | | 10/1968 | Kraus |
| 3,747,341 | A | * | 7/1973 | Davis ........................ 60/226.2 |
| 3,779,010 | A | * | 12/1973 | Chamay et al. ............ 60/226.2 |
| 3,820,719 | A | | 6/1974 | Clark |
| 4,375,276 | A | * | 3/1983 | Konarski ................ 239/265.29 |
| 4,407,120 | A | | 10/1983 | Timms |

(Continued)

FOREIGN PATENT DOCUMENTS

| EP | 0109219 A2 | 5/1984 |
| EP | 0 315 524 A1 | 5/1989 |

(Continued)

OTHER PUBLICATIONS

EP Search Report (EP App. No. 10002809.1), dated Nov. 21, 2011, 5 pgs.

(Continued)

*Primary Examiner* — William H Rodriguez
(74) *Attorney, Agent, or Firm* — Snell & Wilmer L.L.P.

(57) ABSTRACT

A nacelle assembly includes a first portion having an outer fairing and a trailing edge, and a translatable variable area fan nozzle. The fan nozzle includes two or more nozzle segments, each nozzle segment having first and second opposed ends and a leading edge. The nozzle segments are selectively movable between a stowed position and one or more deployed positions. In the deployed position, an upstream bypass flow exit is formed between the trailing edge and the leading edge. The nacelle assembly further includes a guide mechanism for guiding the nozzle segments between the stowed position and the deployed position. A split beavertail failing shields the guide mechanism against air flow when the nozzle segments are in the stowed position.

21 Claims, 10 Drawing Sheets

(56) References Cited

U.S. PATENT DOCUMENTS

| | | | |
|---|---|---|---|
| 4,519,561 A | 5/1985 | Timms | |
| 4,922,713 A * | 5/1990 | Barbarin et al. | 60/226.2 |
| 5,090,197 A | 2/1992 | Dubois | |
| 5,181,676 A | 1/1993 | Lair | |
| 5,228,641 A * | 7/1993 | Remlaoui | 244/110 B |
| 5,297,387 A | 3/1994 | Carimali et al. | |
| 5,404,714 A | 4/1995 | Davies | |
| 5,547,130 A | 8/1996 | Davies | |
| 5,575,147 A * | 11/1996 | Nikkanen | 60/226.2 |
| 5,655,360 A * | 8/1997 | Butler | 60/226.2 |
| 5,778,659 A * | 7/1998 | Duesler et al. | 60/226.1 |
| 5,806,302 A * | 9/1998 | Cariola et al. | 60/204 |
| 5,833,140 A | 11/1998 | Loffredo | |
| 5,960,626 A | 10/1999 | Baudu et al. | |
| 5,996,937 A | 12/1999 | Gonidec et al. | |
| 6,079,201 A * | 6/2000 | Jean | 60/226.2 |
| 6,167,694 B1 | 1/2001 | Davies | |
| 6,170,254 B1 * | 1/2001 | Cariola | 60/226.2 |
| 6,318,070 B1 | 11/2001 | Rey et al. | |
| 6,474,059 B2 * | 11/2002 | Stretton | 60/226.2 |
| 6,584,763 B2 | 7/2003 | Lymons et al. | |
| 6,681,559 B2 * | 1/2004 | Johnson | 60/204 |
| 6,751,944 B2 | 6/2004 | Lair | |
| 6,845,945 B1 * | 1/2005 | Smith | 244/110 B |
| 6,895,742 B2 | 5/2005 | Lair et al. | |
| 6,945,031 B2 | 9/2005 | Lair | |
| 6,966,175 B2 | 11/2005 | Lair | |
| 6,968,675 B2 | 11/2005 | Ramlaoui | |
| 6,971,229 B2 | 12/2005 | Lair | |
| 6,976,352 B2 * | 12/2005 | Lair | 60/226.2 |
| 7,007,454 B2 | 3/2006 | Dehu et al. | |
| 7,010,905 B2 | 3/2006 | Lair | |
| 7,093,793 B2 | 8/2006 | Lair | |
| 7,127,880 B2 | 10/2006 | Lair et al. | |
| 7,146,796 B2 | 12/2006 | Lair | |
| 7,174,828 B2 | 2/2007 | Davies | |
| 7,264,203 B2 | 9/2007 | Lair | |
| 7,818,958 B2 | 10/2010 | Bulin et al. | |
| 8,006,479 B2 * | 8/2011 | Stern | 60/226.2 |
| 8,104,261 B2 * | 1/2012 | Marshall et al. | 60/226.2 |
| 2004/0079073 A1 | 4/2004 | Ramlaoui et al. | |
| 2005/0188676 A1 | 9/2005 | Lair | |
| 2005/0204742 A1 | 9/2005 | Lair | |
| 2007/0294996 A1 | 12/2007 | Stephan et al. | |
| 2008/0000235 A1 | 1/2008 | Hanson | |
| 2008/0001039 A1 | 1/2008 | Winter et al. | |
| 2008/0084130 A1 | 4/2008 | Darby | |
| 2008/0163606 A1 | 7/2008 | Cini et al. | |
| 2009/0053058 A1 * | 2/2009 | Kohlenberg et al. | 415/227 |
| 2009/0288386 A1 | 11/2009 | Marshall et al. | |
| 2010/0031630 A1 | 2/2010 | Bulin et al. | |
| 2010/0139242 A1 | 6/2010 | Vauchel et al. | |
| 2010/0192715 A1 | 8/2010 | Vauchel et al. | |
| 2010/0205931 A1 | 8/2010 | Baudu et al. | |
| 2010/0229527 A1 * | 9/2010 | Amkraut et al. | 60/226.2 |
| 2010/0229528 A1 * | 9/2010 | Ramlaoui et al. | 60/226.2 |
| 2011/0296813 A1 * | 12/2011 | Frank et al. | 60/230 |

FOREIGN PATENT DOCUMENTS

| | | |
|---|---|---|
| EP | 0 779 429 A2 | 6/1997 |
| EP | 1 052 427 A2 | 11/2000 |
| EP | 1878904 A2 | 1/2008 |
| EP | 2050948 A2 | 4/2009 |
| EP | 1978231 B1 | 2/2012 |
| FR | 2 866 020 A1 | 8/2005 |
| FR | 2917788 A1 | 6/2007 |
| FR | 2921976 A1 | 10/2007 |
| FR | 2922059 A1 | 10/2007 |
| FR | 2912189 A1 | 8/2008 |
| GB | 925010 A | 5/1963 |
| GB | 2285020 A | 6/1995 |
| WO | 02/103189 A1 | 12/2002 |
| WO | WO 2005/082771 A | 9/2005 |
| WO | 2008/045056 A1 | 4/2008 |
| WO | 2008045070 A1 | 4/2008 |
| WO | WO 2008/045034 A1 | 4/2008 |
| WO | WO 2008/045062 A1 | 4/2008 |
| WO | WO 2008/045068 A1 | 4/2008 |
| WO | WO 2008/045081 A1 | 4/2008 |
| WO | WO 2008/456069 A1 | 4/2008 |
| WO | WO 2008/063152 A1 | 5/2008 |
| WO | WO 2008/063154 A1 | 5/2008 |
| WO | 2009/029401 A3 | 8/2009 |

OTHER PUBLICATIONS

EP Exam Report (EP App. No. 08828100.1), dated Dec. 23, 2010, 5 pgs.

European Search Report (EP 10005250), dated Jan. 25, 2012, 5 pgs.

European Search Report dated Jan. 23, 2012 (EP Application No. 10005249), 5 pgs.

Official Action for U.S. Appl. No. 12/057,497, dated Feb. 2, 2012, 17 pgs.

Official Action for U.S. Appl. No. 12/485,559, dated Jun. 12, 2012, 15 pgs.

Official Action for U.S. Appl. No. 12/485,551, dated Jun. 27, 2012, 18 pgs.

English translation of Official Action for Chinese Application No. 200880102315.X, dated Sep. 25, 2012, 32 pgs.

Official Action for Chinese Application No. 201010206330.8, dated Oct. 8, 2012, 6 pgs.

English translation of Official Action for Chinese Application No. 201010206330.8, dated Oct. 8, 2012, 8 pgs.

Official Action for Chinese Application No. 201010156573.5, dated Oct. 10, 2012, 6 pgs.

English translation of Official Action for Chinese Application No. 201010156573,5, dated Oct. 10, 2012, 8 pgs.

Official Action for Chinese Application No. 201010206302.6, dated Nov. 5, 2012, 12 pgs.

English translation of Official Action for Chinese Application No. 201010206302.6, dated Nov. 5, 2012, 16 pgs.

* cited by examiner

FIG. 16

TRANSLATING VARIABLE AREA FAN NOZZLE WITH SPLIT BEAVERTAIL FAIRINGS

RELATED APPLICATIONS

This application is a continuation-in-part of international application Serial No. PCT/US08/72448, which designated the U.S., filed Aug. 7, 2008, which claims the benefit of priority of U.S. Provisional Application Ser. No. 60/954,756, filed Aug. 8, 2007, the disclosures of which are hereby incorporated by reference in their entirety.

TECHNICAL FIELD

The present invention generally relates to gas turbine aircraft engines, and particularly relates to a translating variable area nozzle assembly for a turbofan aircraft engine for use in selectively controlling the fan bypass flow exhausted from the engine in order to adjust the engine's performance under varying flight conditions.

BACKGROUND

Typical aircraft turbofan jet engines include a fan that draws and directs a flow of air into a nacelle and into and around an engine core. The nacelle surrounds the engine core and helps promote the laminar flow of air around the core. The flow of air that is directed into the engine core is initially passed through a compressor that increases the air flow pressure, and then through a combustor where the air is mixed with fuel and ignited. The combustion of the fuel and air mixture causes a series of turbine blades at the rear of the engine core to rotate, and to drive the engine's rotor and fan. The high-pressure exhaust gases from the combustion of the fuel and air mixture are thereafter directed through an exhaust nozzle at the rear of the engine.

Bypass flow is air that is directed around the engine core. In turbofan engines, the bypass flow typically provides the main thrust for an aircraft. The bypass flow also can be used to help slow a landed aircraft. Thrust reversers mounted in the nacelle structure selectively reverse the direction of the bypass flow to generate reverse thrust. During normal engine operation, the bypass flow may or may not be mixed with the engine core exhaust before exiting the engine assembly.

Several turbofan engine parameters are important to optimize design characteristics and performance. An engine's bypass ratio (BPR) is the ratio of the air mass that passes through the engine's fan duct to that passing through the engine core. Higher BPR engines can be more efficient and quiet than lower BPR engines. In general, a higher BPR results in lower average exhaust velocities and less jet noise at a specific thrust rating. A turbofan engine's performance is also affected by the engine's fan pressure ratio (FPR). FPR is the ratio of the air pressure at the engine's fan nozzle exit to the pressure of the air entering the fan. The lower the FPR, the lower the exhaust velocity, and the higher an engine's propulsive efficiency. Reducing an engine's FPR can reach a practical limit, however, as a low FPR can cause engine fan stall, blade flutter or compressor surge under certain operating conditions.

One solution to these problems includes varying the fan nozzle exit area of a high-BPR engine during operation to optimize engine performance under various flight conditions. By selectively varying the fan nozzle's exit area, an engine's bypass flow characteristics can be adjusted to match a particular flight condition. Unfortunately, prior variable area nozzle systems typically have been heavy, expensive and somewhat complex in their structure and operation, and generally require the coordinated movement of multiple components that employ complex drive mechanisms.

Accordingly, a need exists for a variable area nozzle assembly for turbofan aircraft engine that promotes a cost effective, simple and efficient operation for control of engine output under certain flight conditions.

SUMMARY

The invention includes a nacelle assembly for a turbofan aircraft engine having an engine centerline. The nacelle includes a stationary forward nacelle portion having an outer fairing and a trailing edge and a translatable variable area fan nozzle comprising two or more nozzle segments. Each nozzle segment includes first and second opposed ends and a leading edge that outwardly and rearwardly slopes at a first angle with respect to the engine centerline. The fan nozzle is selectively movable between a stowed position and one or more deployed positions. In the deployed position, an upstream bypass flow exit is formed between the trailing edge and the leading edge. The nacelle further includes a split beavertail fairing including an upstream fairing portion on the outer fairing and a downstream fairing portion on at least one end of at least one nozzle segment. When the at least one nozzle segment is in the stowed position, the upstream fairing portion and the downstream fairing portion combine to form a substantially continuous outer surface extending between the outer fairing and the at least one nozzle segment. When the at least one nozzle segment is in the deployed position, the upstream fairing portion and the downstream fairing portion define a substantially rearwardly extending elongated gap therebetween, the elongated gap being inclined with respect to the engine centerline at a second angle.

The invention also includes a nacelle assembly for a turbofan aircraft engine having a centerline that includes a stationary forward nacelle portion and a thrust reverser including a translatable sleeve having an outer fairing and a trailing edge. The translatable sleeve is movably disposed aft of the stationary forward nacelle portion. A translatable variable area fan nozzle includes two or more nozzle segments, each nozzle segment having first and second opposed ends and a leading edge that outwardly and rearwardly slopes at a first angle with respect to the engine centerline. The fan nozzle is selectively movable between a stowed position and one or more deployed positions. In the deployed position, an upstream bypass flow exit is formed between the trailing edge and the leading edge. A split beavertail fairing includes an upstream fairing portion on the outer fairing and a downstream fairing portion on at least one end of at least one nozzle segment. When the at least one nozzle segment is in the stowed position, the upstream fairing portion and the downstream fairing portion combine to form a substantially continuous outer surface extending between the outer fairing and the at least one nozzle segment. When the at least one nozzle segment is in the deployed position, the upstream fairing portion and the downstream fairing portion define a substantially rearwardly extending elongated gap therebetween that is inclined with respect to the engine centerline at a second angle.

The invention further includes a nacelle assembly including a first portion having an outer fairing and a trailing edge, and a translatable variable area fan nozzle comprising two or more nozzle segments, each nozzle segment having a circumferential end and a leading edge. The fan nozzle is selectively movable between a stowed position and one or more deployed positions. In the deployed position, an upstream bypass flow exit is formed between the trailing edge and the leading edge. A split fairing includes an upstream fairing portion on the outer fairing and a downstream fairing portion on at least one end of at least one nozzle segment. When the at least one nozzle segment is in the stowed position, the upstream fairing portion and the downstream fairing portion combine to form a substantially continuous outer surface extending between the outer fairing and the at least one nozzle segment. The upstream fairing portion includes a first surface and the downstream fairing portion includes a second surface, wherein the first surface is substantially parallel to the second surface. When the at least one nozzle segment is in the stowed position, the first surface and the second surface are adjacent to one another in overlapped relation. The first surface and the second surface form a substantially rearwardly extending gap therebetween when the at least one nozzle segment is in the deployed position.

In another embodiment, a nacelle assembly includes a first portion having an outer fairing and a trailing edge. A translatable variable area fan nozzle includes two or more nozzle segments, each nozzle segment having first and second opposed ends and a leading edge. The nozzle segments are selectively movable between a stowed position and one or more deployed positions. In the deployed position, an upstream bypass flow exit is formed between the trailing edge and the leading edge. The nacelle assembly further includes means for guiding the nozzle segments between the stowed position and the deployed position, and means for shielding the means for guiding against air flow.

These and other features, aspects, and advantages of the invention will be apparent from a reading of the following detailed description together with the accompanying drawings, which are briefly described below.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the invention.

DETAILED DESCRIPTION

FIGS. 1-8 show one embodiment of a translating variable area fan nozzle assembly (VAFN) for a turbofan engine 10.

Figure 1:
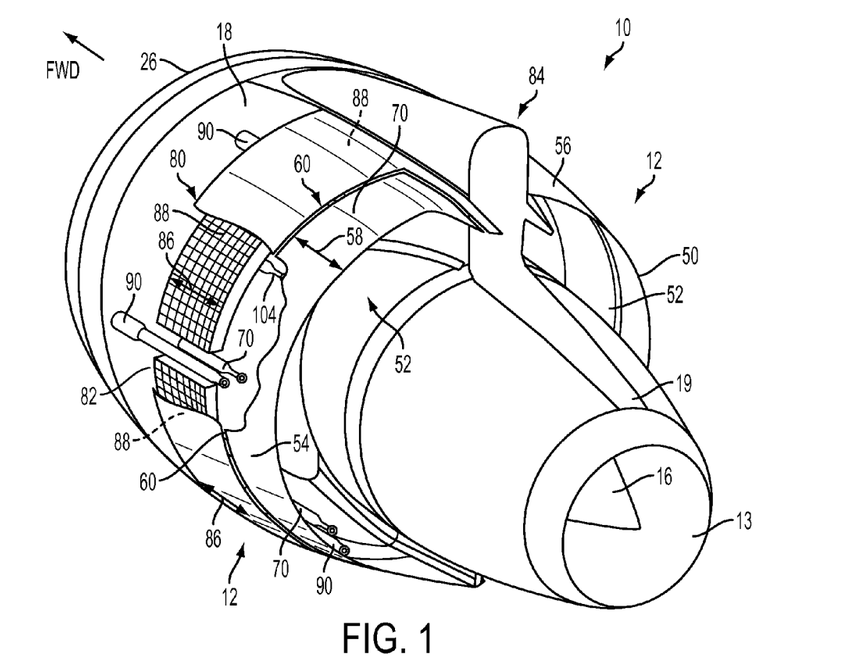
FIG. 1 is a perspective view of an aircraft engine having a cascade-type thrust reverser and a translating variable area fan nozzle assembly.
Figure 2:
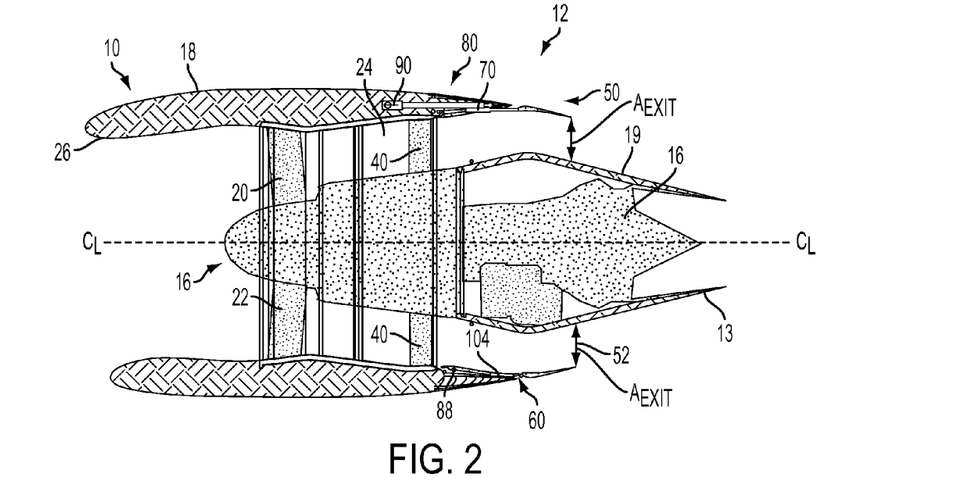
FIG. 2 is a longitudinal cross section of the aircraft engine shown in FIG. 1.

Referring to FIGS. 1 and 2, the engine 10 includes a trailing edge fan nozzle assembly 12 having a translating nozzle 50 that can be selectively adjusted, for example, as the engine 10 operates under different flight conditions. As discussed above, such an adjustment can be used to optimize an engine's performance. As shown in FIG. 2, the translating nozzle 50 can be selectively translated (i.e., moved fore and aft) to vary the fan nozzle's exit area "$A_{exit}$" in order to optimize engine performance, and as described in detail below, to adjust an amount of engine bypass flow spilled through an upstream exit 60 formed by the variable area fan nozzle assembly 12. By bleeding or spilling off excess fan flow through the upstream exit 60 before the excess air flow reaches the primary fan nozzle exit 52, lower fan pressure ratios for the same amount of delivered mass flow can be obtained, thereby increasing stall margins and avoiding engine malfunction and shutdown. For purposes of illustration, the variable area fan nozzle assembly 12 is shown in the context of a turbofan jet aircraft engine 10. The engine 10 can be mounted to a wing or fuselage of an aircraft, for example, by a pylon or other similar support (not shown in the figures).

As shown in FIG. 2, the engine 10 includes an engine core 16 and a stationary nacelle 18 surrounding the core 16. The engine core 16 is housed within a core cowl 19. The engine's fan 20 is positioned within an upstream portion of the nacelle 18, and includes a plurality of fan blades 22 that are mounted on the engine's rotor (not shown). The fan blades 22 rotate about the engine's centerline $C_L$ and draw a flow of air into an inlet end 26 of the engine 10. An annular bypass duct 24 is defined between the engine core 16 and the nacelle 18. The air flow drawn into the engine 10 is accelerated by the rotating fan blades 22, and a portion of the incoming air flow is directed into and through the engine core 16.

Bypass flow enters the upstream end of the nacelle 18 and flows around and past the engine core 16. The bypass flow is accelerated by the rotating fan blades 22 and passes through the bypass duct 24 and past stators 40, and exits the engine 10 through the variable area fan nozzle assembly 12. The high-pressure heated exhaust gases from the combustion of the fuel and air mixture exit the engine core 16 through a primary exhaust nozzle 13 at the aft end of the engine 10.

Figure 3:
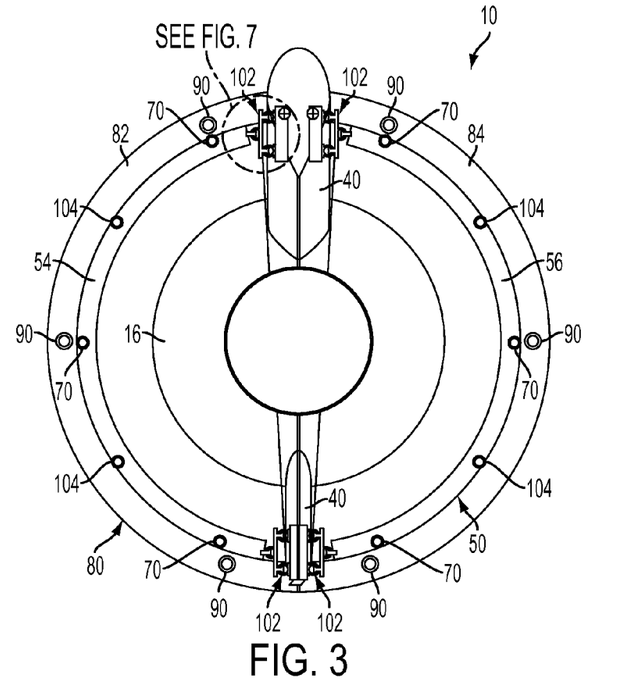
FIG. 3 is a rear elevation view of the aircraft engine shown in FIGS. 1-2.

In the engine assembly 10 shown in FIGS. 1-8, the translating nozzle 50 is a nozzle-like annular airfoil structure mounted at the trailing end of a cascade-type thrust reverser 80 that circumscribes the engine core cowl 19 immediately aft of the nacelle 18. As shown in FIG. 2, a downstream nozzle exit 52 between the trailing edge of the fan nozzle 50 and the core cowl 19 defines a fan nozzle exit area "$A_{exit}$". Due to the longitudinal variations in the diameter of the core cowl 19, selective fore and aft movement of the translating nozzle 50 changes the size of the fan nozzle exit area $A_{exit}$. As shown in FIG. 1, the fan nozzle 50 can include a first arcuate nozzle section 54 and a second arcuate nozzle section 56, each nozzle section 54, 56 being axially translatable in the direction of the bidirectional arrow 58. Translation of the translating nozzle 50 effects a desired size of the upstream exit 60 (shown in FIG. 2), and also varies the outlet geometry and effective exit area $A_{exit}$ of the downstream nozzle exit 52. Hence, when the translating nozzle 50 is deployed, there is an increase in the bypass flow that is discharged from the engine assembly 10 through both the upstream exit 60 and the enlarged downstream nozzle exit 52. As shown in FIGS. 1-3, the translating nozzle 50 can be selectively translated fore and aft by a plurality of linear nozzle actuators 70, for example.

The cascade-type thrust reverser 80 can be positioned forward of the translating nozzle 50 in order to selectively block and redirect bypass flow from the bypass duct 24 in a manner known in the art. In FIG. 1, the thrust reverser 80 and the translating nozzle 50 are both in their stowed positions. As shown in FIG. 1, the thrust reverser 80 can include a first arcuate sleeve section 82 and an opposed second arcuate sleeve section 84 (shown in FIG. 3). As indicated by bi-directional arrow 86 in FIG. 1, the thrust reverser sleeve sections 82, 84 can be translated in the fore and aft directions by a plurality of spaced sleeve actuators 90. In a stowed position, the thrust reverser sleeve sections 82, 84 cover an array of cascade vanes 88. The cascade vanes 88 are indicated by dashed lead lines in FIG. 1 because they are not visible when the thrust reverser 80 is in its stowed position. Axial translation of the thrust reverser sleeve sections 82, 84 in the aft direction to a deployed position and deployment of a series of blocker doors 134 within the bypass duct 24 (as indicated by arrow 136 in FIG. 8) causes bypass air flow to exit the bypass duct 24 through the cascade vanes 88 which turn the exiting flow in a generally forward direction to create reverse thrust.

FIG. 3 is a partial section view of the aft end of the engine 10, and illustrates one arrangement of the nozzle and sleeve actuators 70, 90, respectively, around the periphery of the engine 10. As shown in FIG. 1, and more clearly in FIG. 3, the sleeve half section 82 and the nozzle half-section 54 cooperate to generally define an approximately 180-degree sector of the combined thrust reverser and translating nozzle structure. Likewise, sleeve half section 84 and nozzle half section 56 cooperate to generally define an opposed approximately 180-degree sector of the thrust reverser and translating nozzle structure. Together, these approximate 180-degree sectors cooperate to define the complete thrust reverser/translating nozzle structure.

Figure 7:
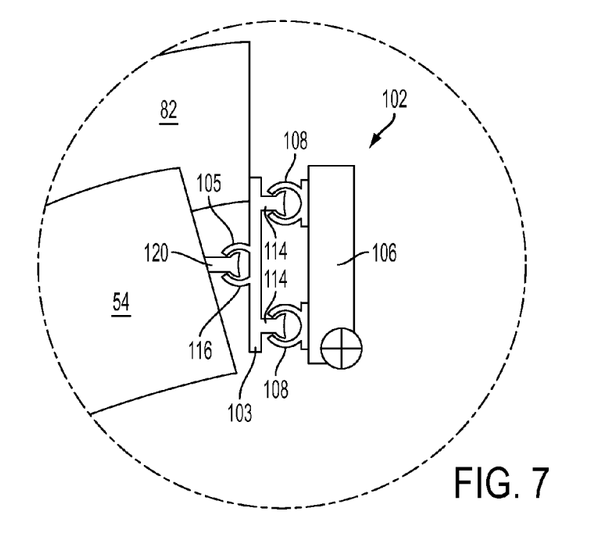
FIG. 7 is a cross sectional view of a guide structure for movably supporting a thrust reverser sleeve and a variable area fan nozzle.

As shown in FIGS. 1-3, the thrust reverser sleeve sections 82, 84 can each be selectively translated in the fore and aft directions by one or more circumferentially spaced sleeve actuators 90 that are connected to the nacelle 18. In the embodiment shown, three actuators 90 are used for each sleeve half-section 82, 84. As discussed above, each section 54, 56 of the translating nozzle 50 can be selectively translated by one or more circumferentially spaced nozzle actuators 70. In the embodiment shown, each nozzle actuator 70 is disposed between a thrust reverser sleeve section 82, 84 and a respective fan nozzle section 54, 56. The sleeve actuators 90 and the nozzle actuators 70 can be electrical, mechanical, pneumatic, hydraulic, or the like, and can be interconnected by appropriate power cables and conduits (not shown). The number and arrangement of nozzle and sleeve actuators 70, 90 can vary according to the thrust reverser and nozzle assembly configurations or other factors. As shown in FIG. 3, the nozzle sections 54, 56 can be movably mounted on the engine 10 by upper and lower guide structures 102. FIG. 7 shows a detail view of one embodiment of a guide structure 102. As shown in FIGS. 1-3, guide tubes 104 can be mounted to the nacelle 18, and can extend into the nozzle sections 54, 56 to stabilize the nozzle sections 54, 56 against undesirable translation and/or vibration. The guide tubes 104 can each include an elongated slider 271 that translates within the tube (not shown in the figures), for example.

The translating nozzle 50 can be a continuous nozzle (not shown in the figures), or as shown in FIG. 3, can include two or more arcuate nozzle sections having airfoil profiles. The upstream exit 60 shown in FIG. 2 is formed when the translating nozzle 50 is deployed in the aft direction away from the thrust reverser sleeve sections 82, 84, and can have the form of a generally circular annular gap. Alternatively, the upstream exit 60 can have other non-circular shapes. The gap 60 between the nozzle sections 54, 56 and the sleeve sections 82, 84 can be continuous, or can be interrupted at one or more locations, such as, for example, at points of separation between nozzle segments 54, 56 of the translating nozzle 50. As shown in FIGS. 2-3, the bypass duct 24 can be interrupted at one or more locations by one or more stators 40, or the like.

The translating nozzle 50 and surrounding structure are described below with reference to FIGS. 4-7. In FIGS. 4-7, elements that are obscured or partially obscured due to intervening elements are indicated by dashed lead lines.

Figure 4:
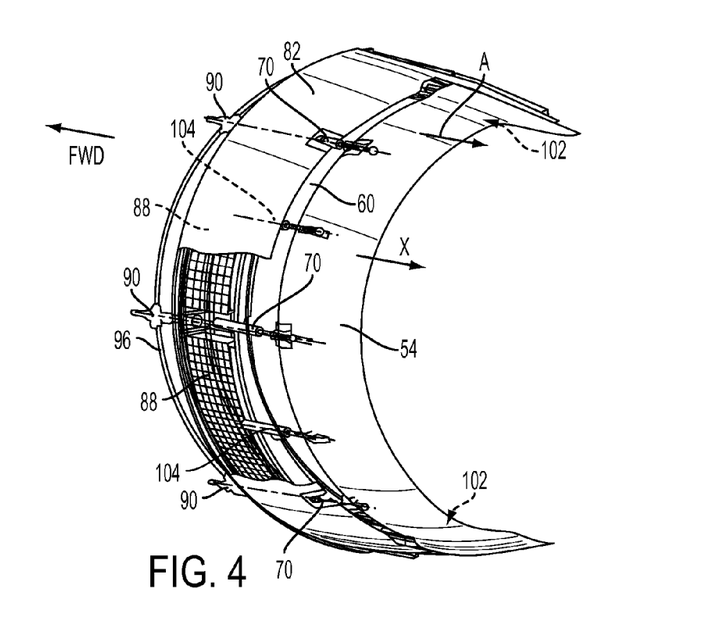
FIG. 4 is a perspective view of the thrust reverser and translating variable fan area nozzle assembly portions of the aircraft engine shown in FIGS. 1-3 with a thrust reverser sleeve in a stowed position, and a variable area fan nozzle in a deployed position.
Figure 5:
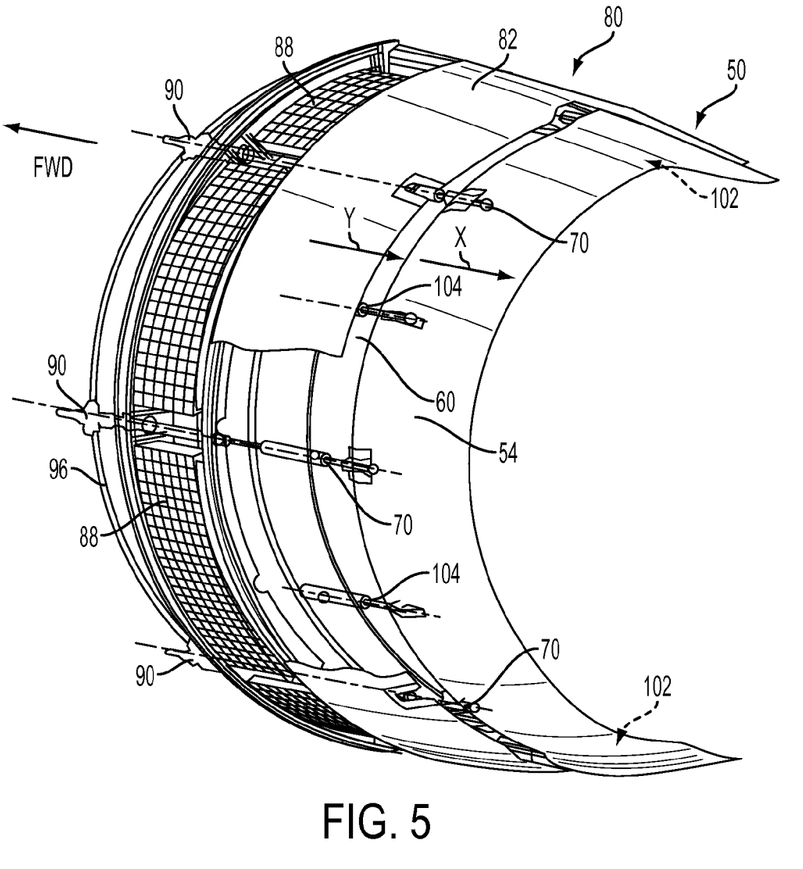
FIG. 5 is a perspective view of the thrust reverser and translating variable area fan nozzle assembly shown in FIG. 4 with both the thrust reverser sleeve and the variable area fan nozzle in deployed positions.

FIG. 4 is a partial view of one embodiment of a mounting structure for a first nozzle section 54 of the translating nozzle 50 and the corresponding, adjacent first sleeve section 82 of the thrust reverser 80. The second nozzle section 56 of the translating nozzle 50 and the second sleeve section 84 of the thrust reverser 80, which are shown in FIGS. 1 and 3, can be mounted in a similar manner (not shown). In FIG. 4, the thrust reverser 80 is in a stowed position, and the first sleeve section 84 covers an associated portion of the cascade vanes 88. Also in FIG. 4, the translating nozzle 50 is in an open or deployed position, and the upstream exit 60 is disposed between the first nozzle section 54 and the first sleeve section 84. Rearward axial translation of the first nozzle section 54 from its stowed position to its deployed position is indicated in FIGS. 4-5 by directional arrow "X". As shown in FIG. 4, the nozzle actuators 70 can extend from the sleeve section 82 and across the upstream exit 60, and can connect to a forward portion of the nozzle section 54. The guide tubes 104 can also extend from the sleeve section 82 and across the upstream exit 60, and can connect to a forward portion of the nozzle section 54. A flexible shaft 96 can interconnect two or more of the sleeve actuators 90 to power the actuators 90, and/or to synchronize actuation of two or more actuators 90.

FIG. 5 shows the first thrust reverser sleeve section 82 and the first translating nozzle section 54 in their deployed positions. Rearward axial translation of the first sleeve section 82 from its stowed position (as shown in FIG. 4) to its deployed position (as shown in FIG. 5) is indicated in FIG. 5 by directional arrow "Y". Rearward translation of the sleeve section 82 exposes the cascade vanes 88 during operation of the thrust reverser 80.

Figure 6:
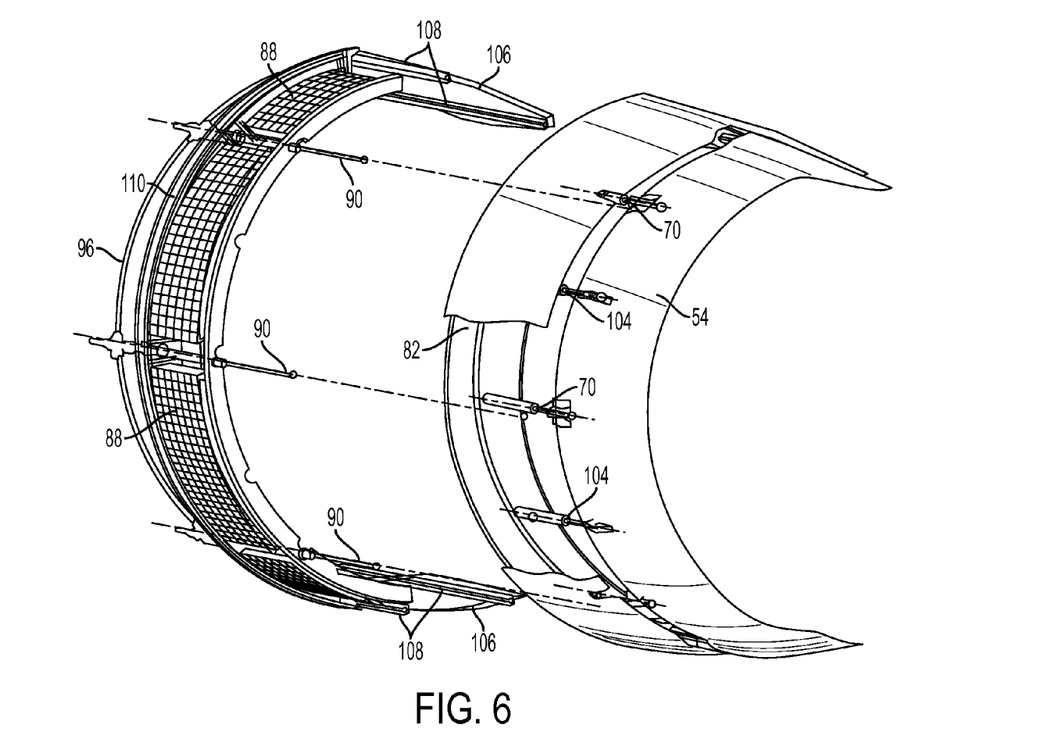
FIG. 6 is an exploded perspective view of the thrust reverser and translating variable area fan nozzle assembly shown in FIGS. 4-5.

FIG. 6 is an exploded view showing the first sleeve section 82 and its corresponding first nozzle section 54 separated from the cascades 88 and sleeve actuators 90. As shown in FIG. 6, one or more nozzle actuators 70 can movably connect the nozzle section 54 to the thrust reverser sleeve section 82.

FIG. 7 shows one embodiment of the upper or lower guide structures 102 for movably connecting a thrust reverser segment 82 and a nozzle section 54 to an engine 10. Referring generally to FIGS. 3 and 6 and particularly to FIG. 7, the guide structure 102 can include a beam 106 that can be fixedly attached to a transverse bulkhead 110 on an aft end of a nacelle 18. The beam 106 can include one or more longitudinally extending guide tracks 108. A slide 103 can include one or more longitudinally extending track bars 114 that are slidably received within the guide tracks 108 of the fixed beam 106. The slide 103 is connected to the thrust reverser sleeve section 82, and thereby slidably connects the sleeve section to the beam 106. The slide 103 can also include an axially extending track guide 116 in which a translating nozzle track bar 120 on the nozzle section 54 is slidably received, thus slidably connecting the nozzle section 54 to the nacelle 18. Accordingly, the nozzle section 54 can axially translate as the track bar 120 slides within the track guide 116. The nozzle section 54 is thereby slidably mounted with respect to the sleeve section 82 of the thrust reverser 80. The translating sleeve section 82 and the track bar 120 can be actuated through conventional actuation means, such as mechanical, electric, hydraulic or pneumatic or other equivalent actuators, for example.

Figure 8:
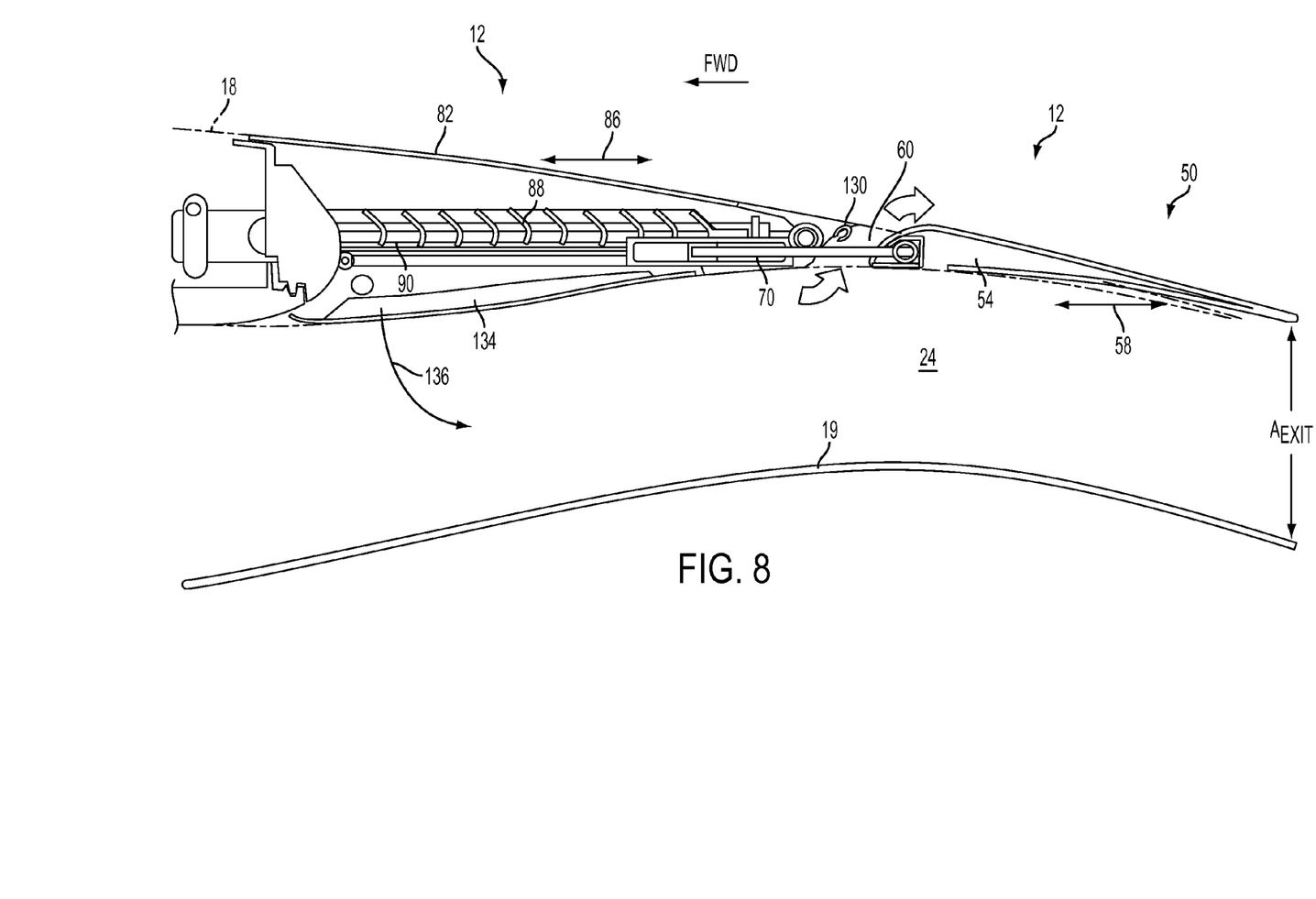
FIG. 8 is a cross sectional view of the thrust reverser and variable area nozzle assembly shown in FIGS. 1-6.

FIG. 8 illustrates one method of operating the nozzle section 54 to bleed or spill off excess bypass flow through the upstream exit 60. As described above, the sizes of the upstream exit 60 and the nozzle exit area $A_{exit}$ can be varied in order to achieve different engine operating conditions. The upstream exit 60 acts as a "bleed" exit that diverts at least some bypass flow from the bypass duct 24. FIG. 8 shows a partial section of a downstream portion of the nozzle assembly 12, and shows a portion of the bypass air flow (indicated by curved arrows) exiting the bypass duct 24 through the annular upstream exit 60 in one mode of operation of the nozzle assembly 12. In FIG. 8, the first nozzle section 54 of the translating nozzle 50 is rearwardly displaced from the first thrust reverser sleeve section 82 by its associated nozzle actuators 70. The second nozzle section 56 can be similarly and simultaneously rearwardly displaced from the second thrust reverser sleeve section 84 by its associated nozzle actuators 70. As shown in FIG. 8, the thrust reverser 80 can include a plurality of blocker doors 134 that are pivotally connected to the first sleeve section 82 and swing in the direction of the curved arrow 136 to selectively block and redirect the bypass flow from the bypass duct 24 and through the cascade vanes 88 during thrust reverser operation.

Still referring to FIG. 8, a high pressure seal 130 can be disposed between the thrust reverser sleeve section 82 and the first nozzle section 54, such as on the trailing edge of the sleeve section 82, for example. In certain modes of operation, when the sleeve section 82 and nozzle section 54 are drawn together, the seal 130 can operate to substantially seal any gap between the adjacent sleeve section 82 and nozzle section 54, and thereby substantially prevent bypass air flow from passing between the sleeve section 82 and nozzle section 54. Similarly, a seal 130 can be disposed between the second thrust reverser sleeve section 84 and the second nozzle section 56. Alternatively, the seal 130 can be mounted on the leading edges of the nozzle sections 54, 56, for example.

As discussed above, the nozzle and sleeve actuators 90, 70 can be mechanical, hydraulic, pneumatic or electric actuators, for example. In one embodiment, the nozzle actuator 70 is a constant opening air spring damper with hydraulic closing override, and the sleeve actuator 90 is an electric actuator. Alternatively or in addition, one or more of the actuators 70, 90 can be like an actuator described in U.S. Pat. No. 7,174,828 or in U.S. Pat. Application Publication No. 2008/0084130A1, both assigned to Goodrich Actuation Systems Ltd., for example, the disclosures of which are hereby incorporated by reference.

FIGS. 9A-11 show a variable area nozzle assembly 212 for a turbofan engine having no cascade-type thrust reverser. The nozzle assembly 212 can be mounted to a nacelle 18 as generally illustrated in FIG. 1, but with no intervening thrust reverser. Generally, elements shown in FIG. 9A-11 that are analogous to elements shown in FIGS. 1-8 have similar reference numerals preceded by a "2" or "3."

Figure 9A:
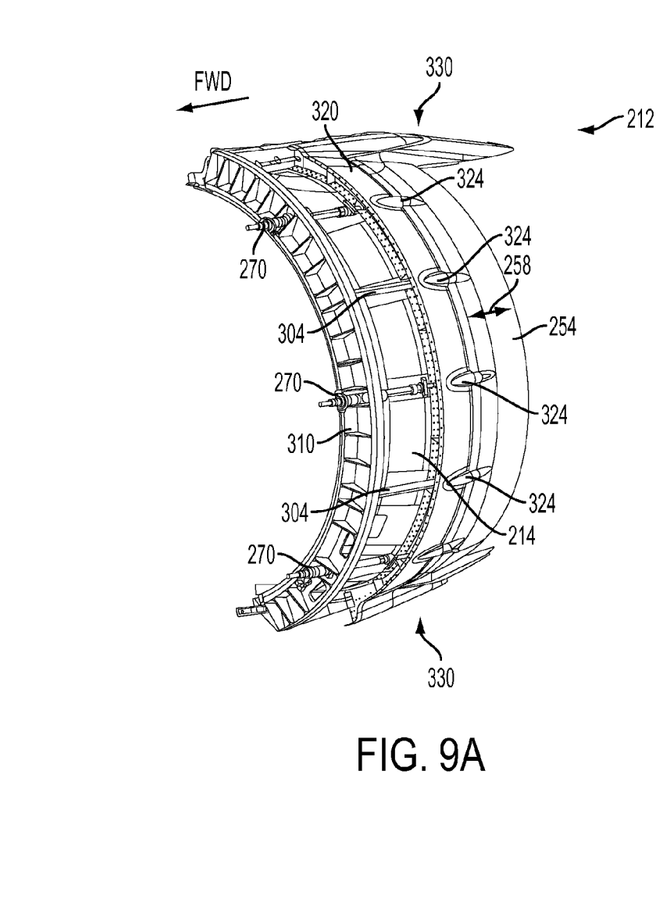
FIG. 9A is a perspective view of a variable area fan nozzle assembly for use with an aircraft engine having no cascade-type thrust reverser with a translating nozzle in a stowed position.
Figure 9B:
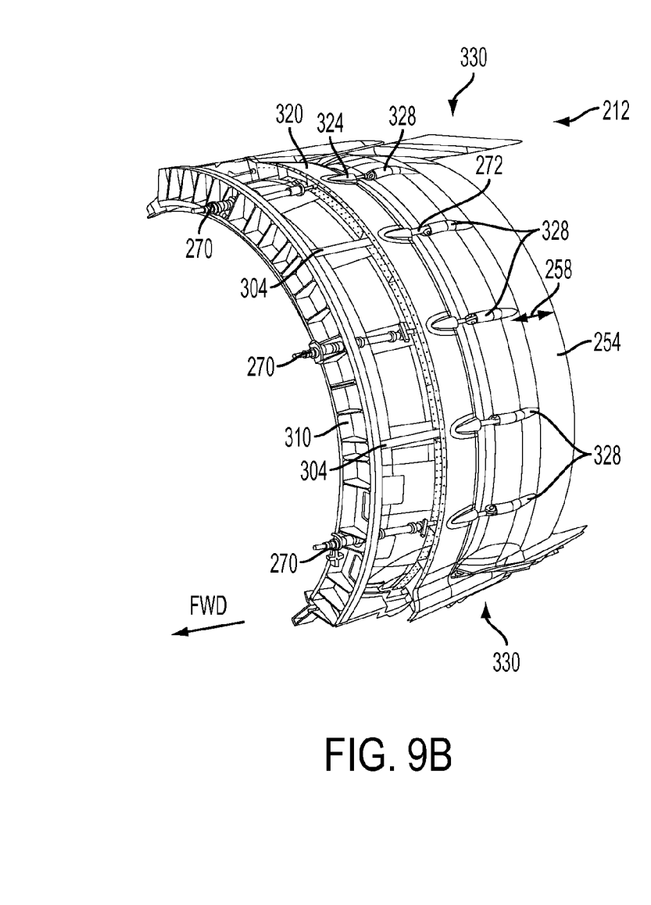
FIG. 9B is a perspective view of the variable area fan nozzle assembly shown in FIG. 9A with the translating nozzle in a deployed position.

FIGS. 9A and 9B are partial cutaway illustrations of a variable area nozzle assembly 212. In the cutaway illustrations, a transverse bulkhead 310 and an outer duct structural liner 214 of an associated stationary nacelle are visible. The nozzle assembly 212 includes a translating nozzle assembly that includes two opposed nozzle sections, of which one nozzle section 254 is shown in FIGS. 9A and 9B. In FIG. 9A, the nozzle section 254 is in a closed or stowed position, and in FIG. 9B, the nozzle section 254 is in an open or deployed position.

The nozzle section 254 is mounted on the aft end of a stationary nacelle structure, such as to a transverse bulkhead 310. Peripherally spaced nozzle actuators 270 can be attached to the bulkhead 310 at one end, and attached to a nozzle section 254 at their opposite ends. Guide tubes 304 can also be attached to the transverse bulkhead 310 at one end, and attached to a bulkhead 311 of the nozzle section 254 at their opposite ends. As shown in FIG. 9B, the aft ends of sliders 271 that are slidably received within the tubes 304 can be attached to the nozzle section 254. The nozzle actuators 270 can act in unison to translate the nozzle section 254 in the direction of the bidirectional arrow 258. Referring to FIG. 9B, actuator shafts 272 of the nozzle actuators 270 can pass through an outer fairing 320 located forward of the nozzle section 254. Upstream fairing 324 can be provided at the points where the actuator shafts 272 and the guide tube sliders 271 pass through the outer fairing 320 in order to reduce drag induced by the actuators 270 and guide tube assemblies 304. Similarly, downstream fairing 328 can be provided at the points where the actuator shafts 272 and guide tube sliders 271 pass through the nozzle section 254.

Figure 10:
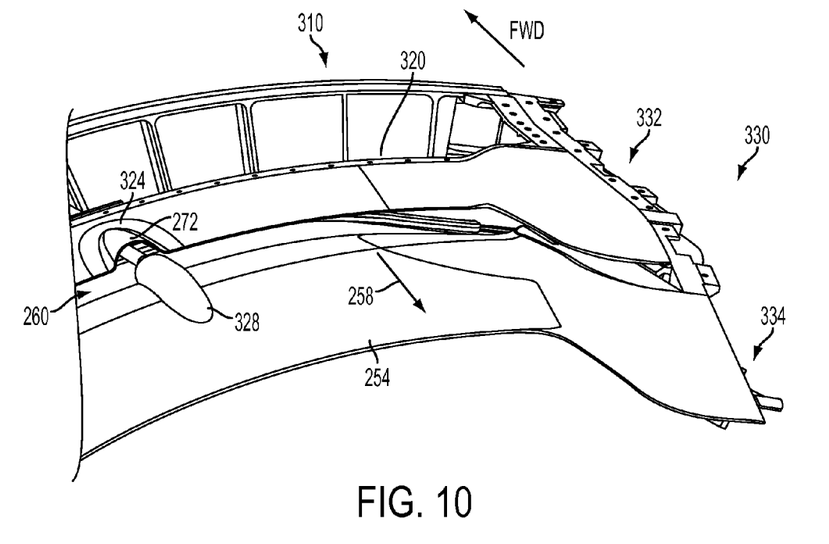
FIG. 10 is a perspective view of a portion of the variable area fan nozzle assembly shown in FIGS. 9A-9B with the translating nozzle in a deployed position.
Figure 11:
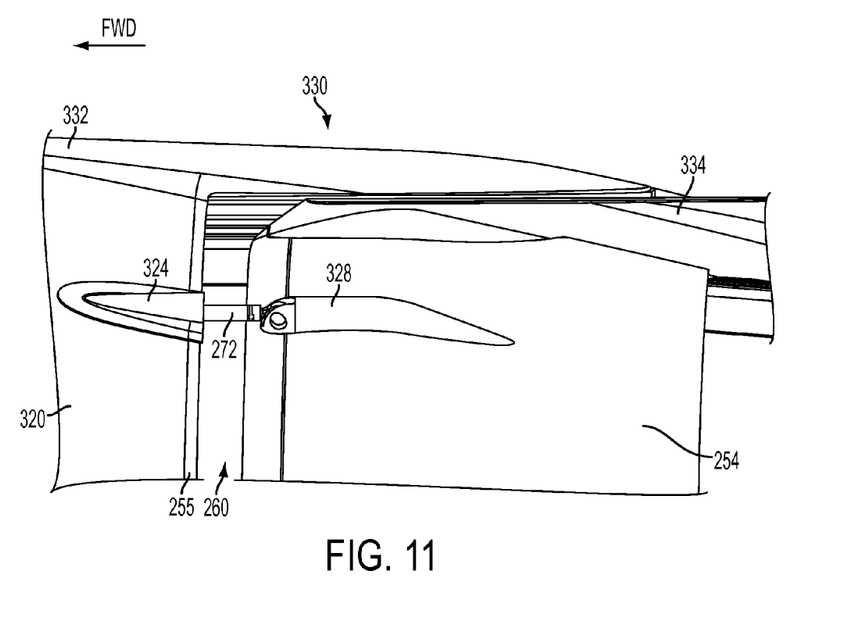
FIG. 11 is a side elevation view of a portion of the variable area fan nozzle assembly shown in FIGS. 9A-9B with the translating nozzle in a deployed position.

As shown in FIG. 10, each end of each nozzle section 254 can terminate at a split beavertail fairing 330. As shown in FIGS. 10 and 11, each end of an outer fairing 320 of a nacelle can include an upstream portion 332 of a split beavertail fairing 330, and each end of a translating nozzle section 254 can include a downstream portion 334 of the split beavertail fairing 330. Rearward translation of the nozzle section 254 creates an upstream exit 260 between the nozzle section 254 and a trailing edge of the outer fairing 320, and separates the upstream portion 332 and the downstream portion 334 of the split beavertail fairing 330, thus forming an elongated gap 331. As shown in FIG. 11, a forward edge 255 of the nozzle section 254 can include an airfoil leading edge profile to facilitate smooth air flow through the upstream exit 260, and to minimize flow disruption caused by the actuator shafts 272, or the like.

Figure 12:
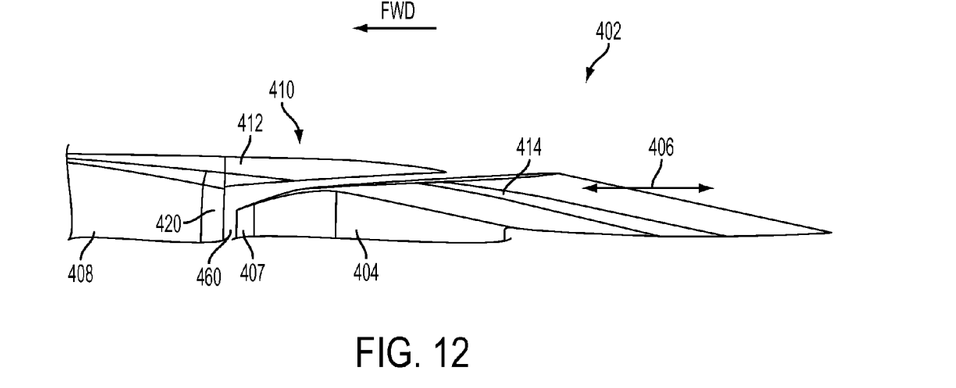
FIG. 12 is a side elevation view of one embodiment of a split fairing for use with a translating variable area fan nozzle like that shown in FIGS. 1-6 and 9A-11.
Figure 13:
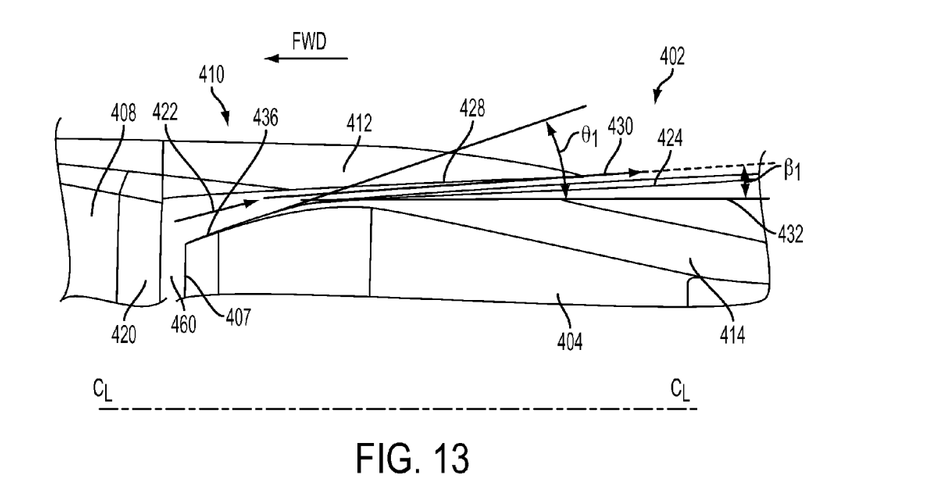
FIG. 13 is another side elevation view of the split fairing shown in FIG. 12.

FIGS. 12-13 show one embodiment of a split fairing 410 for use with a variable area nozzle assembly 402 mounted to a nacelle 18 in a manner similar to that described above, and as generally shown in FIG. 1 or in FIGS. 9A-9B. Such a split fairing 410 can be used in nacelle embodiments with or without cascade-type thrust reversers.

The variable area nozzle assembly 402 can include a translating nozzle having two nozzle sections, of which a portion of one nozzle section 404 is shown in FIGS. 12-13. In FIGS. 12-13, the nozzle section 404 is shown in an open or deployed position. As discussed above, a translating nozzle section 404 can be movably mounted to an aft end of a nacelle (as shown in FIGS. 9A-9B) or to an aft end of a thrust reverser (as shown in FIG. 1). As shown in FIG. 12, the nacelle or thrust reverser to which the nozzle section 404 is mounted can include an outer fairing 408. Selective translation of the translating nozzle section 404 in the direction of the bidirectional arrow 406 opens and closes an upstream exit 460 between the leading edge 407 of the nozzle segment 404 and a trailing edge 420 of the outer fairing 408. The forward edge 407 of the nozzle segment 404 can include an airfoil leading edge profile to facilitate substantially smooth flow of the exiting bypass flow through the upstream exit 460.

Opposed ends of the nozzle section 404 and each end of the outer fairing 408 can include a split beavertail fairing 410. One embodiment of a split beavertail fairing 410 at one end of the nozzle section 404 is shown in FIGS. 12-13. In the embodiment shown in FIGS. 12-13, each end of the outer fairing 408 includes an upstream beavertail fairing portion 412, and each end of the nozzle section 404 includes a downstream beavertail fairing portion 414. The beavertail split fairing 410 helps to facilitate smooth air flow in the vicinity of the mechanisms that movably support the ends of the nozzle section 404 on an engine, such as air flow in the vicinity of an elongated guide structure 102 like that shown in FIGS. 3 and 7, for example.

The general path of bypass flow that exits through the upstream exit 460 is indicated by arrow 422 in FIG. 13. The flow direction 422 is substantially parallel to the leading edge 436 of the nozzle section 404. In the immediate vicinity of the split beavertail fairing 410, bypass flow exiting through the upstream exit 460 then passes between an upper surface 424 of the downstream beavertail fairing portion 414 and an opposed lower surface 428 of the upstream beavertail fairing portion 412. The general direction of the bypass flow that passes between the opposed surfaces 424, 428 of the split beavertail fairing 410 is indicated in FIG. 13 by arrow 430. In FIG. 13, the angle of the exiting bypass flow with respect to the engine's longitudinal centerline $C_L$ and with respect to reference line 432 is indicated as angle $\beta_1$. Reference line 432 is parallel to the engine centerline.

As also shown in FIG. 13, a leading edge 436 of the translating nozzle section 404 can have an outward and rearward slope that is generally at an angle $\theta_1$ relative to a reference line 432, which is parallel to the engine's longitudinal centerline. In one embodiment, the bypass flow exit angle $\beta_1$ in the vicinity of the split beavertail fairing 410 and the slope $\theta_1$ of the leading edge 436 of the nozzle section 404 can be selected to minimize noise associated with the outward flow of air through and around the gap between the opposed surfaces 424, 428, and to enhance engine performance. In one embodiment, the angle of the slope $\theta_1$ of the leading edge 436 is less than or equal to about 20 degrees, and the bypass flow exit angle $\beta_1$ in the vicinity of the split beavertail fairing 410 is less than or equal to about 10 degrees. In this embodiment, the difference between the angles $\beta_1$ and $\theta_1$ is equal to about 10 degrees.

A leading edge angle $\theta_1$ of less than or equal to about 20 degrees and an exit angle $\beta_1$ equal to less than or equal to 10 degrees alters the direction of exiting bypass flow as the flow passes through the upstream exit 460 between the upstream and downstream beavertail fairing portions 412, 414 of the split fairing 410 in a manner that minimizes the degree of turbulent air flow in the immediate vicinity of the split beavertail fairing 410. In addition, the exit angle $\beta_1$ can be sufficiently shallow (i.e. about 10 degrees or less) to minimize the cross flow angle between the exiting bypass flow 430 and rearward external air flow just outside of the upstream exit 460. As a result, noise can be minimized, and engine performance can be enhanced. The angle of inclination of the upper surface 424 of the downstream beavertail fairing portion 414 can be at an angle that is less than or equal to about 10 degrees with respect to the engine centerline $C_L$ in order to achieve a desired exit angle $\beta_1$. In addition, the opposed lower surface 428 of the upstream beavertail fairing portion 412 can be disposed substantially parallel to the upper surface 424 of the downstream beavertail fairing portion 414.

Figure 14:
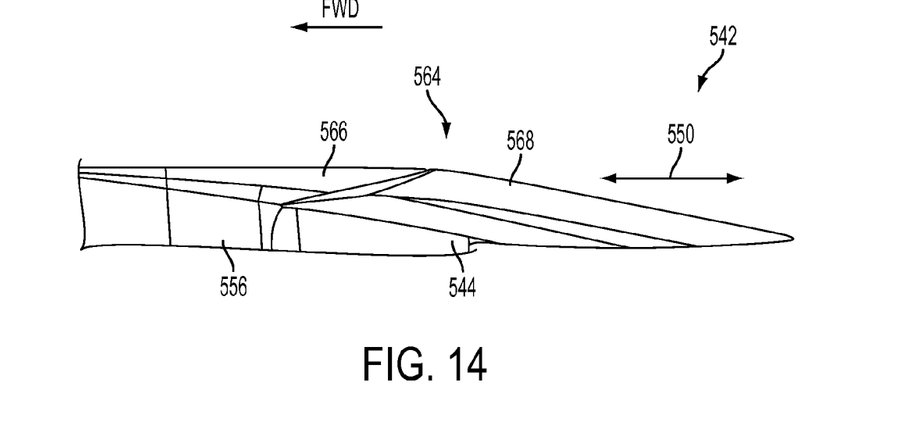
FIG. 14 is a side elevation view of another embodiment of a split fairing for use with a translating variable area fan nozzle like that shown in FIGS. 1-6 and 9A-11 with the translating variable area fan nozzle sleeve in a deployed position.
Figure 15:
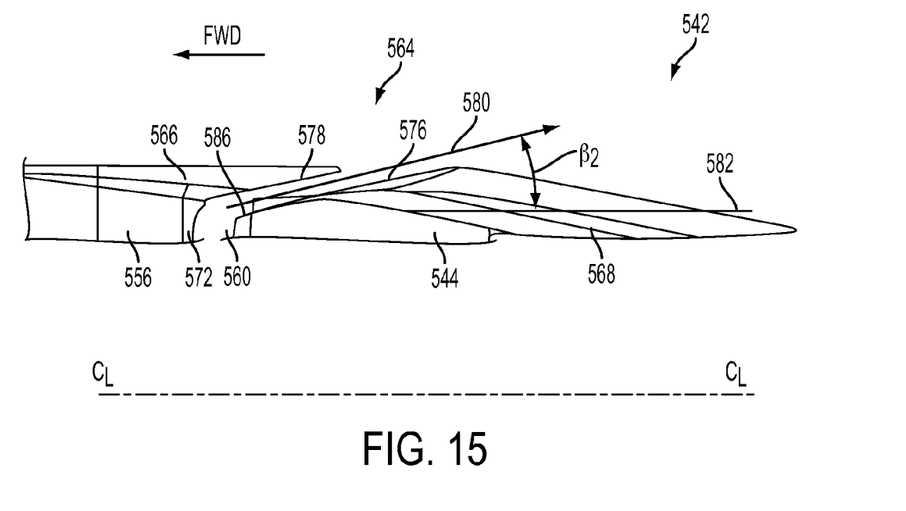
FIG. 15 is another side elevation view the split fairing shown in FIG. 14.
Figure 16:
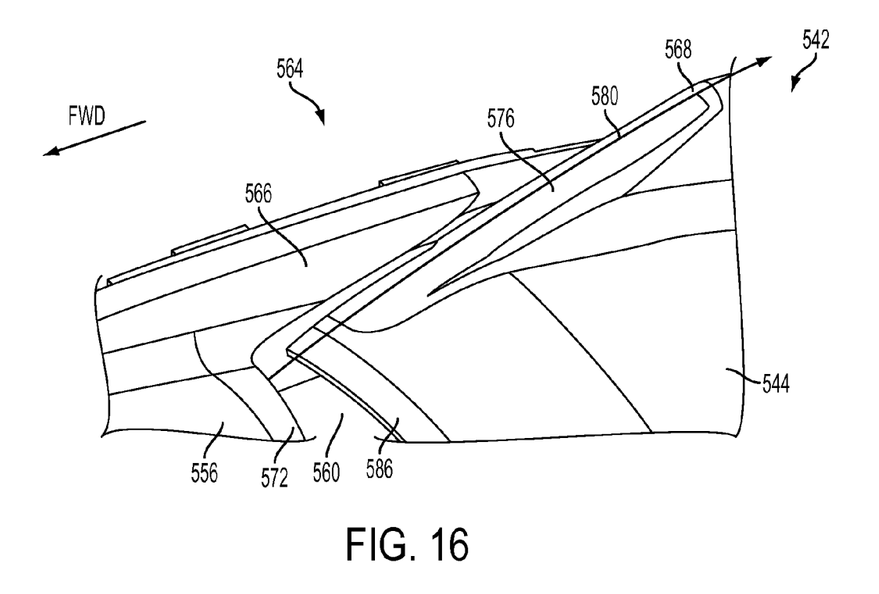
FIG. 16 is a perspective view of the split fairing shown in FIGS. 14-15.

FIGS. 14-16 show another embodiment of a split beavertail fairing 564 for use with a variable area fan nozzle assembly 542 like that described above. Again, the variable area fan nozzle assembly 542 can be mounted to a nacelle or to a cascade-type thrust reverser, such as generally shown in FIG. 1 and FIGS. 9A-9B, respectively.

As shown in FIGS. 14-16, each end of a translating nozzle segment 544 of a variable area fan nozzle assembly 542 can terminate at a beavertail split fairing 564 (a typical end of one translating nozzle section 544 is shown in FIGS. 14-16). The beavertail split fairings 564 help to facilitate smooth air flow in the vicinity of the mechanisms that movably support the ends of the translating nozzle sections on an engine, such as in the vicinity of the elongated guide structures 102 shown in FIGS. 3-5, for example. As shown in FIGS. 14-16, each end of a cooperating outer fairing 556 of a nacelle or thrust reverser sleeve can include an upstream beavertail fairing portion 566, and each end of the translating nozzle section 544 can include a cooperating downstream beavertail fairing portion 568. As shown in FIGS. 15-16, aftward translation of the nozzle section 544 from the stowed position shown in FIG. 14 opens an upstream exit 560 between the leading edge 586 of nozzle section 544 and the aft edge 572 of the associated outer fairing 556. In FIGS. 15-16, the forward edge 586 of the nozzle segment 544 can include an airfoil leading edge profile to facilitate the flow of air through the upstream exit 560, and to minimize flow disruption caused by actuators or other objects that may be disposed within or across the upstream exit 560.

The general direction of the flow of air exiting the upstream exit 560 from a bypass duct is indicated by directional arrow 580 in FIG. 15. This flow direction 580 is substantially parallel to the angle of inclination of the leading edge 586 of the nozzle segment 544. In the immediate vicinity of the split beavertail fairing 564, the flow exits the upstream exit 560 in a direction that is generally dictated by an upper surface 576 of the downstream beavertail fairing portion 568 and an opposed lower surface 578 of the upstream beavertail fairing portion 566. The direction of that portion of the exiting bypass flow that passes between the surfaces 576, 578 of the split beavertail fairing 564 is also generally indicated by arrow 580. In FIG. 15, the exit angle of exiting bypass flow passing through the upstream exit 560 in the vicinity of the split beavertail fairing 564 is indicated as angle $\beta_2$, which is measured with respect to the engine's longitudinal centerline $C_L$, and with respect to reference line 582 (which is parallel to the engine centerline). The leading edge 586 of the translating nozzle section 544 also slopes at an angle $\beta_2$ with respect to reference line 582 and to the engine centerline. In other words, the direction 580 of the flow passing between the surfaces 576, 578 of the split beavertail fairing 564 is substantially parallel to the leading edge 586 of the nozzle section 544. Preferably, any difference in the flow direction 580 and the angle of slope $\beta_2$ of the leading edge 586 is less than about 5 degrees, and most preferably about zero. The exit angle and the angle of slope $\beta_2$ of the leading edge 586 of the nozzle section 544 can be selected to minimize turbulence in the area of the beavertail fairing 564, thereby minimizing noise associated with the variable area fan nozzle assembly 502.

A leading edge angle $\beta_2$ and a substantially equal exit angle of less than about 15 degrees redirects the bleed flow as it passes through the upstream exit 570 in the vicinity of the split beavertail fairings 564 in a manner that minimizes turbulence, and thus noise. A shallow exit angle $\beta_2$ also minimizes the angle of cross flow between the exiting bypass flow and external air flow in the vicinity of the upstream exit 560. Thus, engine noise can be minimized, and engine performance can be enhanced. The inclination of the upper surface 576 of the downstream beavertail fairing portion 568 can be at an angle of less than about 15 degrees with respect to the engine centerline $C_L$ in order to obtain a desired exit angle $\beta_2$.

Persons of ordinary skill in the art will understand that while the invention has been described in terms of various embodiments and various aspects and features, certain modifications, variations, changes and additions can be made to the described embodiments without departing from the spirit and scope of the invention. Such modifications, variations, changes and additions are intended to be within the scope of the appended claims.

What is claimed is:

1. A nacelle assembly for a turbofan aircraft engine having an engine centerline, the nacelle comprising:
   a stationary forward nacelle portion having an outer fairing and a trailing edge;
   a translatable variable area fan nozzle comprising two or more nozzle segments, each nozzle segment having first and second opposed ends and a leading edge that outwardly and rearwardly slopes at a first angle with respect to the engine centerline, the fan nozzle being selectively movable between a stowed position and one or more deployed positions, wherein in the deployed position, an upstream bypass flow exit is formed between the trailing edge and the leading edge; and
   a split beavertail fairing comprising an upstream fairing portion on the outer fairing and a downstream fairing portion on at least one end of at least one nozzle segment;
   wherein when the at least one nozzle segment is in the stowed position, the upstream fairing portion and the downstream fairing portion combine to form a substantially continuous outer surface extending between the outer fairing and the at least one nozzle segment; and
   wherein when the at least one nozzle segment is in the deployed position, the upstream fairing portion and the downstream fairing portion define a substantially rearwardly extending elongated gap therebetween, the elongated gap being inclined with respect to the engine centerline at a second angle.

2. The nacelle assembly according to claim 1 wherein the first angle is less than or equal to about 20 degrees, and the second angle is less than or equal to about 10 degrees.

3. The nacelle assembly according to claim 1 wherein the first angle is less than or equal to about 15 degrees, and the second angle is substantially equal to the first angle.

4. The nacelle assembly according to claim 1 wherein the difference between the first angle and the second angle is about 10 degrees.

5. The nacelle assembly according to claim 1 wherein the upstream fairing portion includes a substantially flat lower surface and the downstream fairing portion includes a substantially flat upper surface, and wherein in the deployed position, the elongated gap is disposed between the lower surface and the upper surface.

6. The nacelle assembly according to claim 5 wherein the lower surface and the upper surface are substantially parallel to each other.

7. The nacelle assembly according to claim 1 wherein the translatable variable area fan nozzle comprises a first nozzle segment and a second nozzle segment, and wherein the first and second nozzle segments are substantially mirror images of each other.

8. The nacelle assembly according to claim 1 further comprising a guide mechanism that movably connects the at least one end of the at least one nozzle segment to the forward nacelle portion, and wherein when the at least one nozzle segment is in the stowed position, the upstream fairing portion and the downstream fairing portion combine to cover a substantial portion of the guide mechanism.

9. A nacelle assembly comprising:
   a first portion having an outer fairing and a trailing edge;
   a translatable variable area fan nozzle comprising two or more nozzle segments, each nozzle segment having a circumferential end and a leading edge, the fan nozzle being selectively movable between a stowed position and one or more deployed positions, wherein in the deployed position, an upstream bypass flow exit is formed between the trailing edge and the leading edge; and
   a split beavertail fairing comprising an upstream fairing portion on the outer fairing and a downstream fairing portion on at least one end of at least one nozzle segment;
   wherein when the at least one nozzle segment is in the stowed position, the upstream fairing portion and the downstream fairing portion combine to form a substantially continuous outer surface extending between the outer fairing and the at least one nozzle segment; and
   wherein the upstream fairing portion comprises a first surface and the downstream fairing portion includes a second surface, wherein the first surface is substantially parallel to the second surface, wherein when the at least one nozzle segment is in the stowed position the first surface and the second surface are adjacent to one another in overlapped relation, and wherein the first surface and the second surface form a substantially rearwardly extending gap therebetween when the at least one nozzle segment is in the deployed position.

10. The nacelle assembly according to claim 9 wherein the substantially rearwardly extending gap is inclined at an angle that is less than or equal to about 10 degrees with respect to a longitudinal centerline of the nacelle assembly.

11. The nacelle assembly according to claim 9 wherein the substantially rearwardly extending gap is inclined at a first angle that is substantially equal to an angle of inclination of the leading edge of an adjacent nozzle segment.

12. The nacelle assembly according to claim 9 wherein the first portion comprises a thrust reverser having a translatable sleeve, whereby the outer fairing and the trailing edge are on the thrust reverser translatable sleeve.

13. A nacelle assembly comprising:
- a first portion having an outer fairing and a trailing edge;
- a translatable variable area fan nozzle comprising two or more nozzle segments, each nozzle segment having first and second opposed ends and a leading edge, the nozzle segments being selectively movable between a stowed position and one or more deployed positions, wherein in the deployed position, an upstream bypass flow exit is formed between the trailing edge and the leading edge;
- means for guiding the nozzle segments between the stowed position and the deployed position; and
- means for shielding the means for guiding against air flow when the nozzle segments are in the deployed position;
- wherein the means for shielding comprises a split beavertail fairing including an upstream fairing portion on the first portion and a downstream fairing portion on at least one end of the at least one nozzle segment, wherein when the at least one nozzle segment is in the stowed position, the upstream fairing portion and the downstream fairing portion combine to form a substantially continuous outer surface extending between the first portion and the at least one nozzle segment, and wherein when the at least one nozzle segment is in the deployed position, the upstream fairing portion and the downstream fairing portion form a substantially rearwardly extending gap therebetween, wherein the substantially rearwardly extending gap is inclined with respect to a longitudinal centerline of the nacelle at a first angle.

14. The nacelle assembly according to claim 13 wherein the first angle is less than about 15 degrees.

15. The nacelle assembly for a turbofan aircraft engine having a centerline, the nacelle comprising:
- a stationary forward nacelle portion;
- a thrust reverser comprising a translatable sleeve having an outer fairing and a trailing edge, the translatable sleeve being movably disposed aft of the stationary forward nacelle portion;
- a translatable variable area fan nozzle comprising two or more nozzle segments, each nozzle segment having first and second opposed ends and a leading edge that outwardly and rearwardly slopes at a first angle with respect to the engine centerline, the fan nozzle being selectively movable between a stowed position and one or more deployed positions, wherein in the deployed position, an upstream bypass flow exit is formed between the trailing edge and the leading edge; and
- a split beavertail fairing comprising an upstream fairing portion on the outer fairing and a downstream fairing portion on at least one end of at least one nozzle segment;
- wherein when the at least one nozzle segment is in the stowed position, the upstream fairing portion and the downstream fairing portion combine to form a substantially continuous outer surface extending between the outer fairing and the at least one nozzle segment; and
- wherein when the at least one nozzle segment is in the deployed position, the upstream fairing portion and the downstream fairing portion define a substantially rearwardly extending elongated gap therebetween, the elongated gap being inclined with respect to the engine centerline at a second angle.

16. The nacelle assembly according to claim 15 wherein the first angle is less than or equal to about 20 degrees, and the second angle is less than or equal to about 10 degrees.

17. The nacelle assembly according to claim 15 wherein the first angle is substantially equal to the second angle.

18. The nacelle assembly according to claim 17 wherein the first angle and the second angle are both about 15 degrees.

19. The nacelle assembly according to claim 15 wherein the difference between the first angle and the second angle is about 10 degrees.

20. The nacelle assembly according to claim 15 wherein the translatable variable area fan nozzle comprises a first nozzle segment and a second nozzle segment, and wherein the first and second nozzle segments are substantially mirror images of each other.

21. The nacelle assembly according to claim 15 further comprising a guide mechanism that movably connects the at least one end of the at least one nozzle segment to the forward nacelle portion, and wherein when the at least one nozzle segment is in the stowed position, the upstream fairing portion and the downstream fairing portion combine to cover a substantial portion of the guide mechanism.

* * * * *

UNITED STATES PATENT AND TRADEMARK OFFICE
CERTIFICATE OF CORRECTION

| | | |
|---|---|---|
| PATENT NO. | : 8,505,307 B2 | Page 1 of 1 |
| APPLICATION NO. | : 12/419080 | |
| DATED | : August 13, 2013 | |
| INVENTOR(S) | : Shunshen Richard Wang | |

It is certified that error appears in the above-identified patent and that said Letters Patent is hereby corrected as shown below:

In the Claims

Claim 15, Column 13 Line 33, delete "The" and insert therefor --A--

Signed and Sealed this
First Day of October, 2013

Teresa Stanek Rea
*Deputy Director of the United States Patent and Trademark Office*